Sellers & Walker,
Wheel-Molding Machine.
Nº 13,625. Patented Oct. 2, 1855.
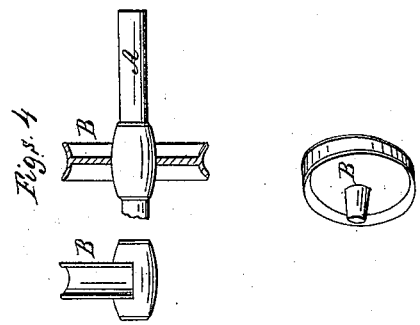
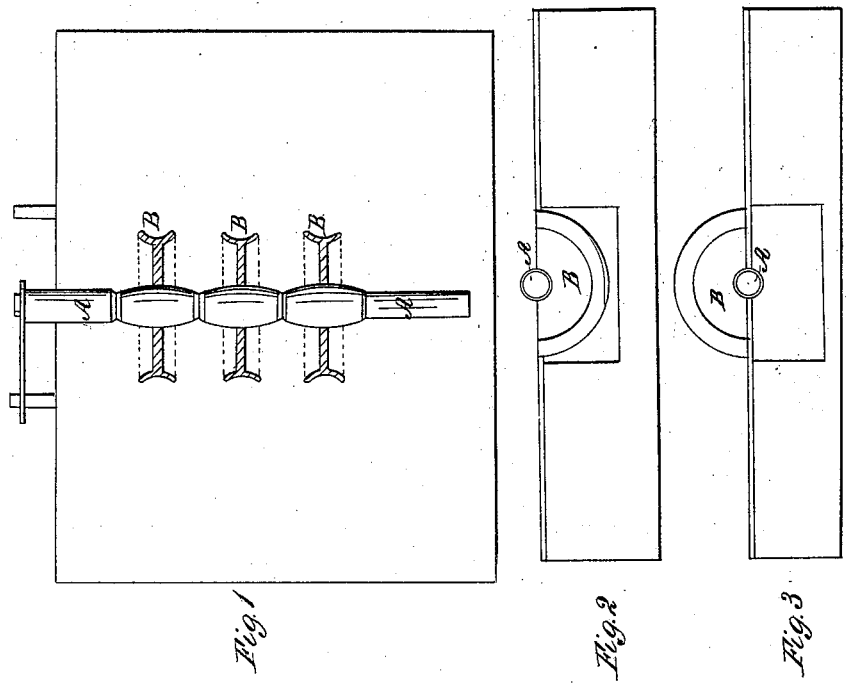

UNITED STATES PATENT OFFICE.

WILLIAM SELLERS AND JAMES WALKER, OF CINCINNATI, OHIO.

IMPROVEMENT IN MOLDING CIRCULAR AND UNDERCUT WORK.

Specification forming part of Letters Patent No. 13,625, dated October 2, 1855.

*To all whom it may concern:*

Be it known that we, WILLIAM SELLERS and JAMES WALKER, of Cincinnati, in the county of Hamilton and State of Ohio, have invented an Improvement in Molding Circular and Undercut Work; and we do hereby declare that the following is a full, clear, and exact description of the principle or character which distinguishes it from all other things before known, and of the usual manner of making, modifying, and using the same, reference being had to the accompanying drawings, of which—

Figure 1 represents a plan; Figs. 2 and 3, side views, one showing the half-pattern ready for removing the mold and the other ready for the mold; Fig. 4, a detached view of the half-pattern and perspective of a pulley.

Our invention consists in a mode of molding grooved and undercut circular work—such as window-pulleys—whereby we facilitate the molding, the casting, and the subsequent finishing operations.

The difficulties of casting undercut or grooved work are such that founders generally prefer to cast solid, where the work is small and circular, and turn out the grooves in a lathe. By our mode we can make with ease any number of grooves in such work, and not only effect a great saving of time and labor, but a great saving of material. Our mode is as follows: We attach to a mandrel or axis, A, a suitable number of half-patterns, B B, &c., and mount the axis so as to revolve the half-pattern in the sand, as shown in Figs. 1, 2, and 3. When the sand has been properly packed about the patterns, they are brought slowly out of the sand by revolving the axis, and thus one half of the mold is made. The other half being made in a similar manner, the casting will be double the half-patterns, and ready to be put into the lathe to be finished off.

What we claim as our invention is—

The method of molding circular undercut work herein described.

WILLIAM SELLERS.
JAMES WALKER.

Witnesses:
T. CAMPBELL,
CHAS. G. PAGE.